July 31, 1956 M. J. MITCHELL 2,756,831
DRIVE MECHANISM FOR IMPLEMENTS SIDE-MOUNTED ON TRACTORS
Filed Sept. 3, 1953 6 Sheets-Sheet 1

INVENTOR.
MELVILLE J. MITCHELL
BY
Carlson, Pitzner, Hubbard & Wolfe
ATTORNEYS.

July 31, 1956  M. J. MITCHELL  2,756,831
DRIVE MECHANISM FOR IMPLEMENTS SIDE-MOUNTED ON TRACTORS
Filed Sept. 3, 1953  6 Sheets-Sheet 2

INVENTOR.
MELVILLE J. MITCHELL
BY
Carlson, Pitzner, Hubbard & Wolfe
ATTORNEYS.

July 31, 1956 M. J. MITCHELL 2,756,831
DRIVE MECHANISM FOR IMPLEMENTS SIDE-MOUNTED ON TRACTORS
Filed Sept. 3, 1953 6 Sheets-Sheet 3

INVENTOR.
MELVILLE J. MITCHELL
BY
Carlson, Pitzner, Hubbard & Wolfe
ATTORNEYS.

July 31, 1956  M. J. MITCHELL  2,756,831
DRIVE MECHANISM FOR IMPLEMENTS SIDE-MOUNTED ON TRACTORS
Filed Sept. 3, 1953  6 Sheets-Sheet 4
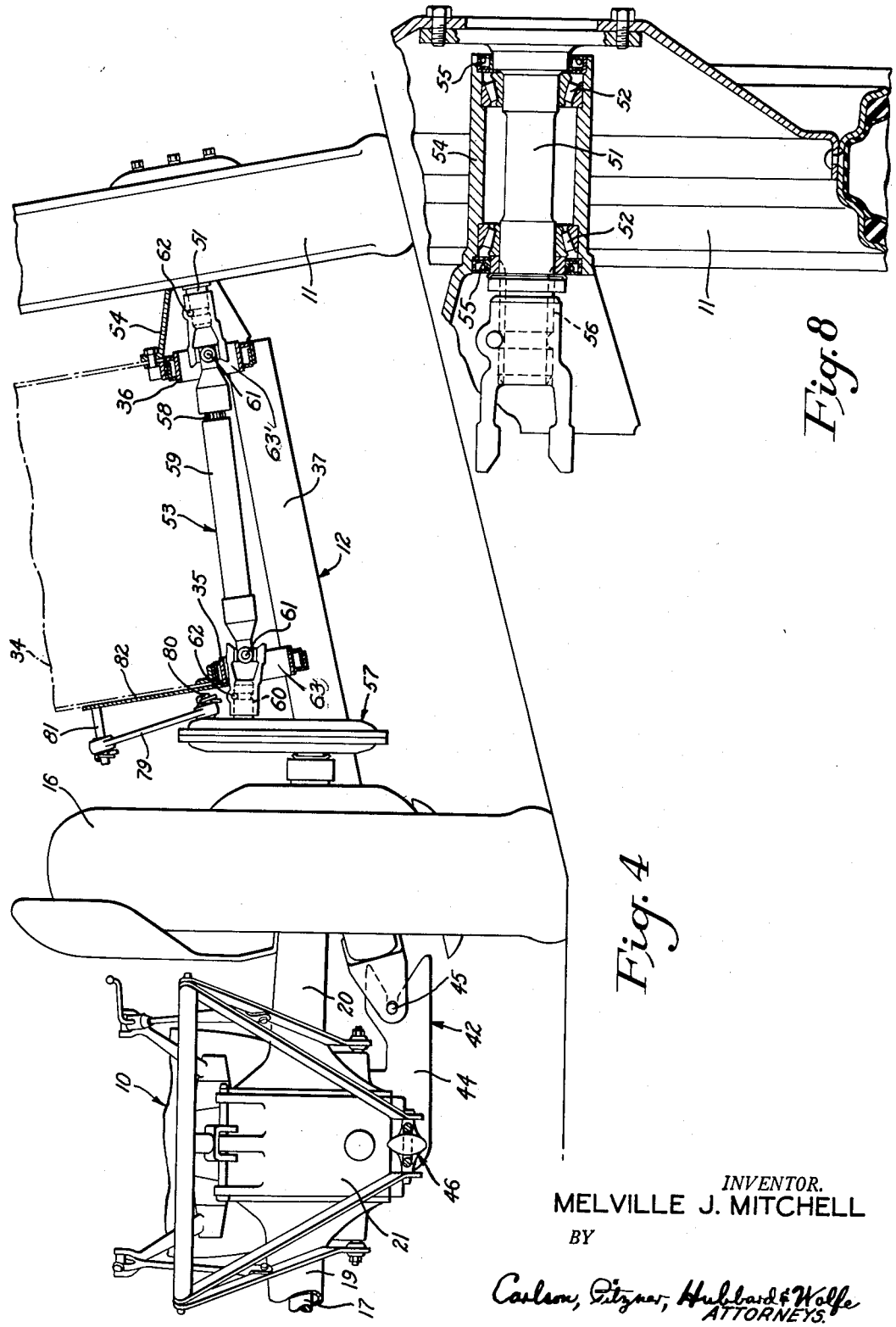
INVENTOR.
MELVILLE J. MITCHELL
BY
Carlson, Pitzner, Hubbard & Wolfe
ATTORNEYS.

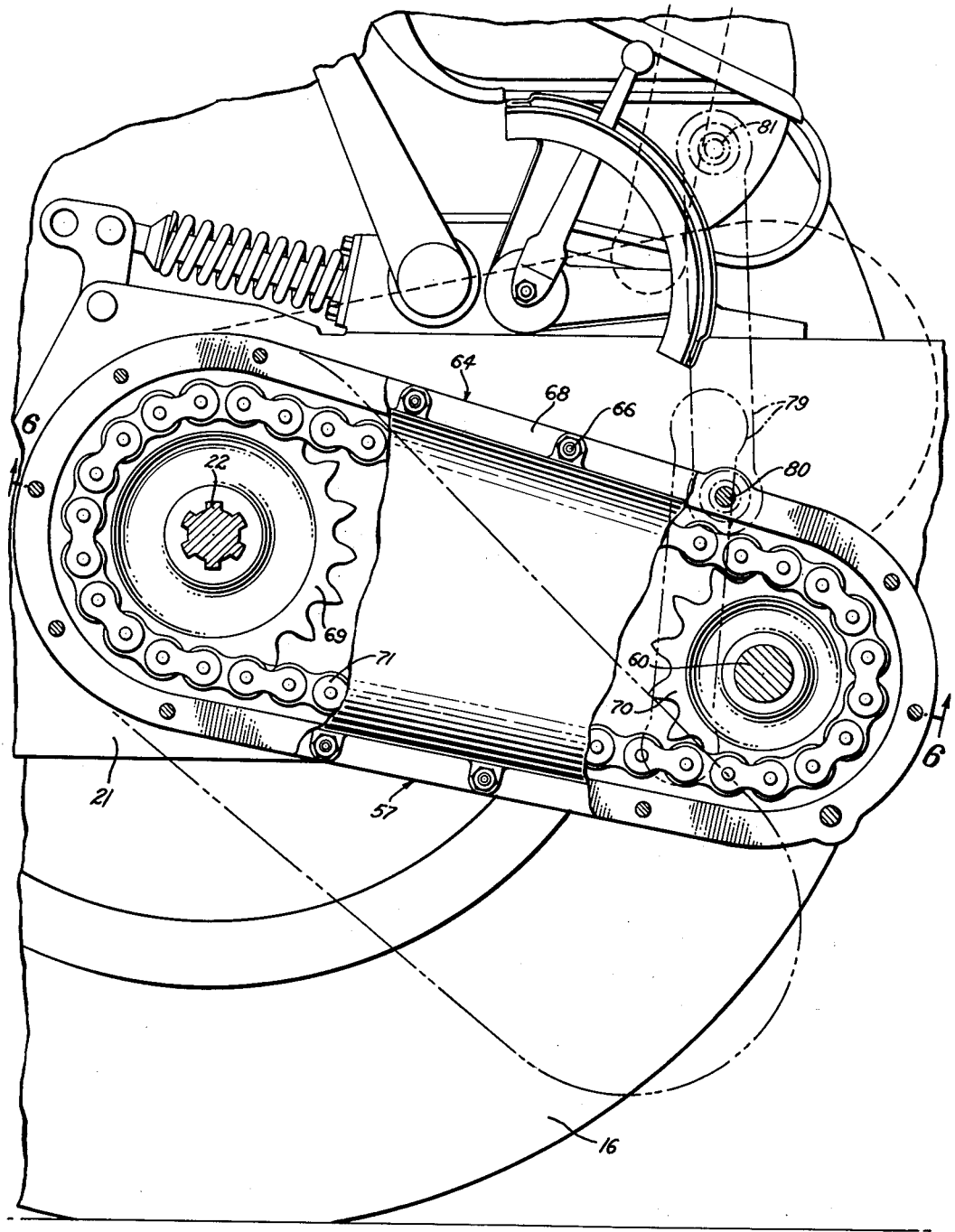

July 31, 1956     M. J. MITCHELL     2,756,831
DRIVE MECHANISM FOR IMPLEMENTS SIDE-MOUNTED ON TRACTORS
Filed Sept. 3, 1953     6 Sheets-Sheet 6

INVENTOR.
MELVILLE J. MITCHELL
BY
Carlson, Pitzner, Hubbard & Wolfe
ATTORNEYS.

United States Patent Office 2,756,831
Patented July 31, 1956

2,756,831

DRIVE MECHANISM FOR IMPLEMENTS SIDE-MOUNTED ON TRACTORS

Melville J. Mitchell, Birmingham, Mich., assignor to Harry Ferguson, Inc., Detroit, Mich., a corporation of Delaware Application September 3, 1953, Serial No. 378,302

7 Claims. (Cl. 180—14)

The present invention relates to power-transmitting drive mechanisms and, more particularly, to such mechanisms finding advantageous use in coupling the outboard ground wheel of an implement to be driven by a live axle of a tractor to which the implement is side-mounted for relative rocking about a fore and aft axis.

In the utilization of agricultural tractors with removably mounted implements, it has been proposed to provide relatively heavy and bulky implements with an outboard ground wheel and means for attaching the implement along the side of the tractor. In order that the tractor is not forced to "carry" the implement and in order that the implement maintain proper working relationship with a crop when the ground is uneven, the attachment means are adapted to allow relative pivoting or rocking about a fore and aft axis. Such rocking action, for example, comes into play when the tractor is driven along the valley or crest of a hill with the implement ground wheel riding on the side of the hill.

Such side-mounted implements where, for example, the ground wheel is located outwardly spaced from but generally parallel to one of the rear drive wheels of the tractor, result in drag or side draft if motive power should be applied entirely through the tractor's rear drive wheels and directed along the longitudinal center line of the tractor. This tends to turn the tractor and make steering difficult, especially on uneevn ground where the gripping effect of the front steering wheels may vary. To remove this undesirable effect, it has been proposed that a driving connection be made from the adjacent rear axle of the tractor to the outboard wheel of the implement, with the adjacent tractor wheel preferably freely journaled. The drive effort in this arrangement is exerted by the two outer wheels of the tractor-implement combination so that substantially no side draft results.

It is a primary object of the present invention to provide an improved drive mechanism of the above described type which is automatically compensated for the relative rocking between a tractor and side-mounted implement with a stable driving operation and increased life of the parts.

It is another object of the invention to provide such a drive mechanism permitting a wide range of rocking between the tractor and implement with only a relatively narrow range of vertical swing of a drive shaft extending to the implement ground wheel.

Still another object of the invention is to provide such a drive mechanism utilizing an extensible drive shaft with universal joints on either end in which the extension range is considerably reduced and angling of the universal joints, with rapid acceelration and deceleration, minimized.

A further object of the invention is to provide such a drive mechanism for use in tractor-implement combinations which requires little vertical space for movement of the drive shaft during relative rocking, thus permitting greater ground clearance and requiring less clearance between the shaft and the implement body.

And a still further object of the invention is to provide such a drive mechanism which is readily detachable and easily utilized with several different side-mounted implements.

Further objects and advantages will become apparent as the following description proceeds, taken in conjunction with the accompanying drawings, in which:

Figs. 3 and 4 are similar to Fig. 2, illustrating, respectively, the position of the drive mechanism when the implement frame is rocked downwardly and upwardly with respect to the tractor;

Fig. 5 is a vertical section taken substantially along line 5—5 in Fig. 2, more clearly illustrating a speed changer utilized in the exemplary embodiment of the invention and showing its controlled positioning by stop motion lines as the implement rocks relative to the tractor;

Fig. 8 is a fragmentary sectional view of an arrangement for mounting an outboard wheel on an implement frame.

Although a particular embodiment of the invention has been shown and described in some detail, there is no intention to thereby limit the invention to the details of such embodiment. On the contrary, it is intended to cover all alterations, modifications, and equivalents falling within the spirit and scope of the invention as defined in the appended claims.

Figure 1:
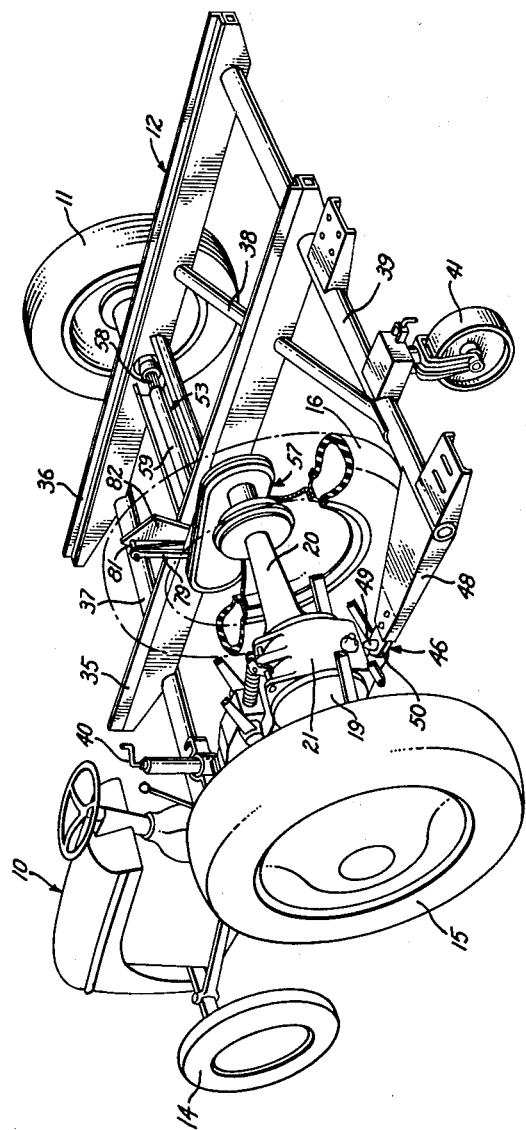
Figure 1 is a perspective view of a tractor and side-mounted implement adapted for relative rocking about a fore and aft axis, together with a drive mechanism embodying the present invention between the tractor and an implement ground wheel.

Referring more particularly to the exemplary embodiment of the invention here shown, the novel drive mechanism is illustrated (Fig. 1) as interconnecting a right rear axle of a tractor 10 with an outboard wheel 11 on a side-mounted implement frame 12. The tractor 10 and implement may themselves take a variety of forms. By way of introduction the portions of the partciular tractor and implement illustrated which coact more or less directly with the novel drive mechanism will be briefly identified so that the environment of the invention will be clear.

Figures 6, 7:
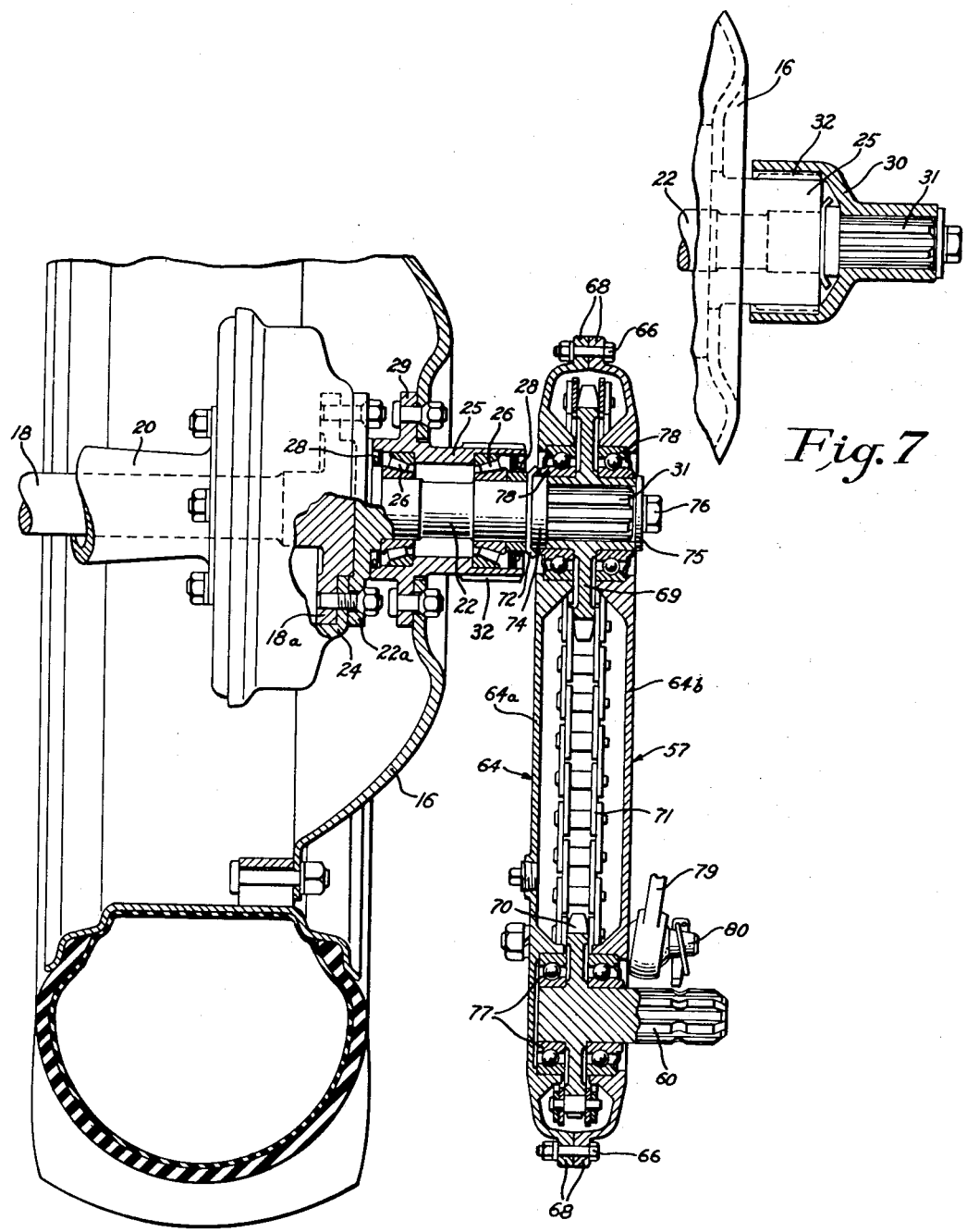
Fig. 6 is a sectional view taken along line 6—6 in Fig. 5.
Fig. 7 is a fragmentary elevation, partially in section, illustrating a coupling sleeve which may be employed in connection with a tractor equipped to have a rear wheel freely rotated when a side-mounted implement is attached.

The tractor 10 itself will be recognized by those skilled in the art as the familiar "Ferguson" tractor. It includes steerable front wheels 14 and larger rear traction wheels 15 and 16 adapted to be driven by rear axles 17 and 18 extending transversely through rear axle housings 19 and 20 from a center housing 21. In this particular instance, the tractor 10 is adapted to have its right rear wheel 16 freely journaled to provide a nondriving weight supporting function. As shown more clearly in Fig. 6, a stub axle 22 is bolted to the outer end of the right rear axle 18 in lieu of the right rear wheel with a brake drum 24 conveniently interposed between the mating flanges 18a and 22a. The stub axle 22 carries a freely rotatable hub 25 journaled by suitable bearings 26 protected by lubricant seals 28, and includes an annular apertured flange 29 to which the tractor wheel 16 is bolted. When the tractor is not to be used with a side-mounted implement and drive coupling, a coupling sleeve 30 may be removably placed over mating splines 31 on the end of the stub axle 22 and keys 32 formed on the outer periphery of the hub 25, to lock them together in order that the wheel 16 may be positively driven from the tractor axle 18 (Fig. 7). Such an arrangement for mounting a tractor wheel in free-wheeling relation by bolting it to a hub journaled on a stub axle, together with a cooperating coupling sleeve for removably locking the hub and stub axle together, is more fully described and claimed in the copending application of Robert W. King, Serial No. 226,783, filed May 17, 1951 (issued February 9, 1954 as Patent 2,668,597), and assigned to the assignee of the present invention.

The implement may be any one of a wide variety which can be advantageously side-mounted on such a tractor, as for example, a corn picker, combine, baler, forage harvester, etc. Simply a suitable form of implement frame 12 (Fig. 1) and general indication of a body 34 (Fig. 2) have been here shown. This particular frame 12 includes a pair of spaced fore and aft body supporting beams 35 and 36 interconnected and braced by transversely extending tubular beams 37, 38, and 39, the foremost and the aft transverse beams 37 and 39 extending to embrace the tractor's right wheel 16 to be coupled to the tractor substantially along its longitudinal center line. The frame 12 may be equipped with an adjustable stand or jack 40 at the front transverse beam 37 and a retractable support wheel 41 at the rear beam 39 which serve to support the implement in elevated and stored position when disconnected from the tractor.

Pivoting of the implement frame 12 to rock up and down about a fore and aft axis accommodates passage over uneven ground. This is accomplished by pivotal couplings between the tractor 10 and the frame 12, the forward coupling 42 being of a snap acting latch and pin type (Fig. 2) with the latch 44 carried by the tractor and the pin 45 by the inner end of the forward transverse beam 37. The rear coupling 46 is formed of cooperating elements located respectively on an elevatable hitch mechanism with which the tractor is equipped and on a tongue 48 extending in a forward direction of the inner end of the aft transverse beam 39. The rear coupling elements are preferably in the nature of vertically engaged hook and eye cooperating parts 49 and 50, permitting the implement to rock about a longitudinal axis as indicated. The particular organization of the cooperating coupling elements and their action affording quick and convenient mounting or dismounting of the implement on the tractor are more fully described and claimed in the copending applications of Noral A. Nelson, Serial No. 218,636, filed March 31, 1951, and Serial No. 379,185, filed September 9, 1953, both assigned to the assignee of the present invention. Further details of the mounting couplings and their arrangements are therefore not given here.

Figure 2:
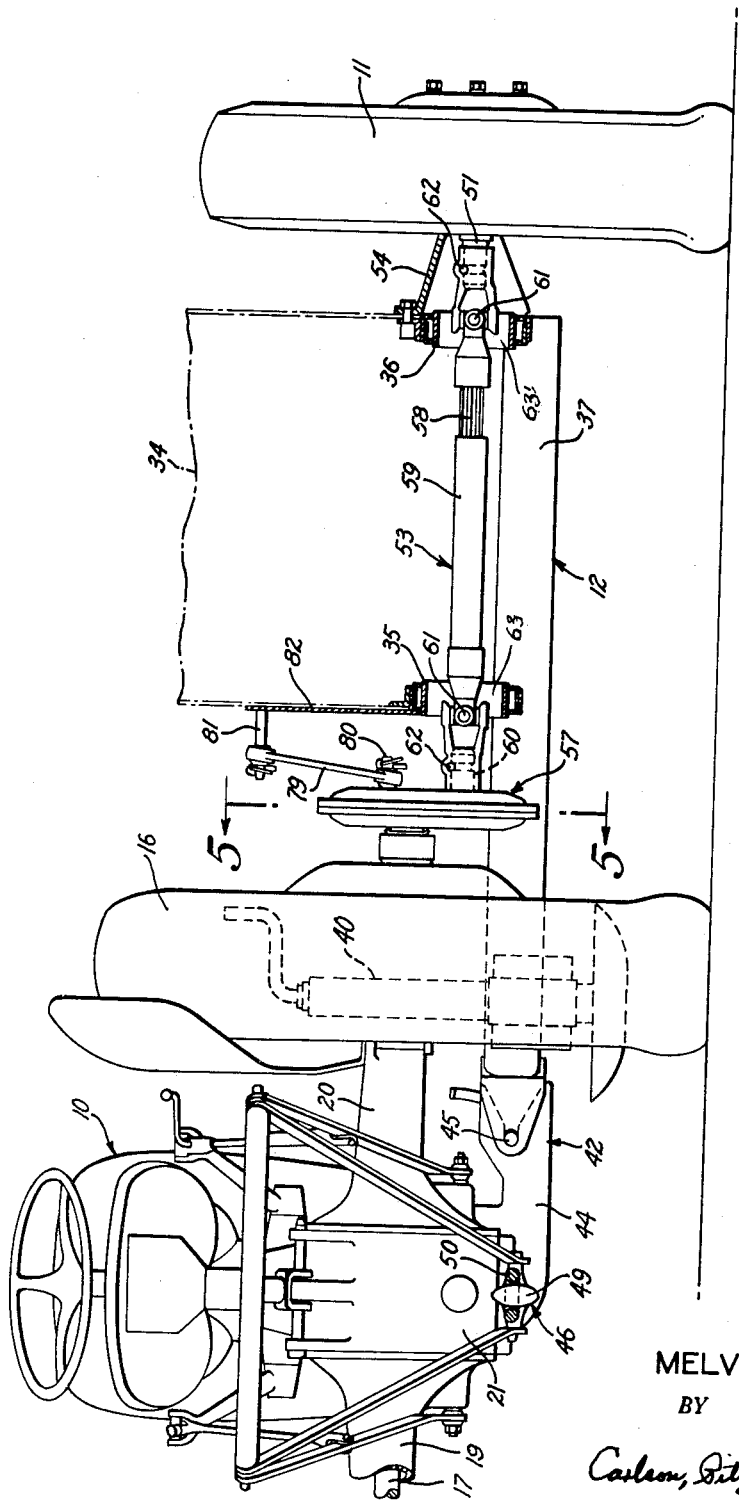
Fig. 2 is a rear elevation, partially in section, of the tractor-implement combination and drive mechanism shown in Fig. 1.

On the outboard side of the implement is a pneumatic tired ground wheel 11. Desirably this wheel is smaller than the big traction wheel 16 on the tractor which it adjoins, both in the interests of weight and cost. With particular reference to Figs. 2 and 8, the outboard wheel 11 has its disc suitably bolted to a stub shaft 51 journaled by tapered roller bearings 52 within a conical type transverse axle bracket 54. Suitable oil seals 55 are provided to exclude dirt and other foreign material from the region of the bearings. The stub shaft 51 extends inwardly through the conical bracket to present its splined end 56 for driving connection.

The problem is posed in such an installation of connecting the live axle 18 of the tractor to the implement wheel 11. Such connection must remain intact as the implement works up and down. Moreover, the distance between the live axle and the outboard wheel changes during such working since the center or axis of rock is not coincident with the end of the live axle 18. And the situation is further aggravated by the fact that the implement wheel 11, being smaller, must have a greater angular velocity than the big tractor wheel 16 to keep up with it, that is, to have the same peripheral speed. It is to the solution of such problems that the present invention is aimed.

Considering now the novel drive mechanism herein shown, it comprises in this instance a jointed, extensible drive shaft 53 together with a power transmitting mechanism or speed changer 57 connecting it to the live axle. Such drive shaft includes inner and outer elongated cooperatively splined sections 58 and 59 which may transmit torque while sliding axially with respect to one another. The drive shaft 53 is disposed in a transverse passageway 63, 63' formed in the implement frame 12, being adapted for driving connection with the wheel 11 and extending inboard thereof toward the tractor. Suitable universal joints 61, which may be of conventional form, are carried at either end of the drive shaft and present themselves for removable connection to the cooperatively splined implement stub shaft 51 and an output shaft 60 of the speed changer. Preferably, the universal joints 61 are provided with quick release detent members 62 cooperating with annular grooves formed in the ends of the shafts 60 and 51 in order that they may be locked thereto, but easily and quickly removed.

Figure 3:
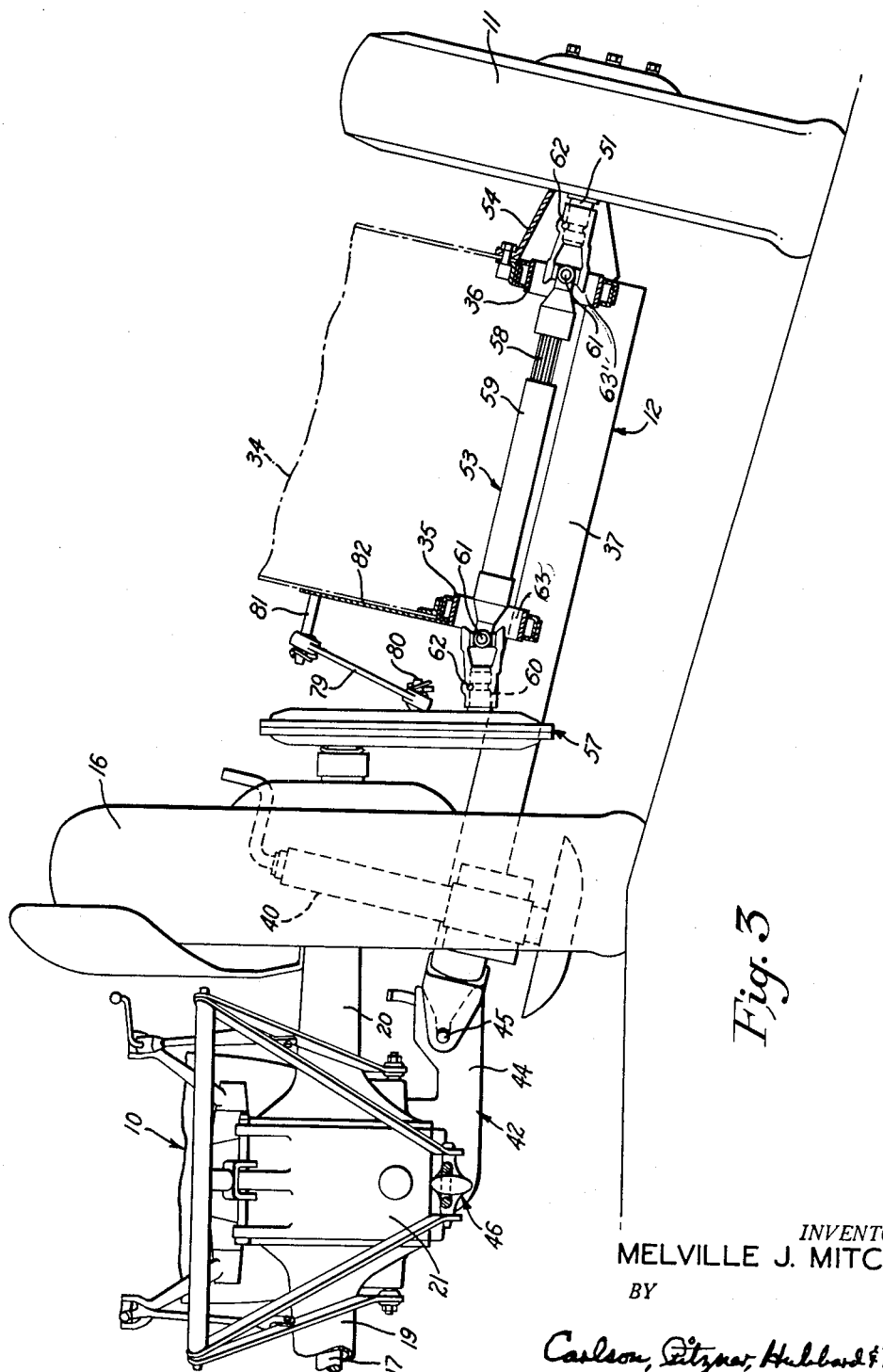

The speed changer 57 is housed in a casing 64 comprising two half shells 64a and 64b fastened together by bolts 66 through mating peripheral flanges 68, and in the illustrated form includes input and output sprockets 69 and 70 connected by an endless roller chain 71 (Fig. 6). The input or drive sprocket 69 is removably splined at 31 to the outer end of the stub axle 22, being held in place by an inner spacer collar 72 and lock nut 74, and an outer washer 75 and bolt 76. The driven sprocket 70 may be formed integrally with the output shaft 60 which is journaled by ball bearings 77 in the casing 64 and which has one end extending through the casing and splined to receive the left universal joint 61 (Figs. 2–4). The ratio of diameters and numbers of teeth for the driving and driven sprockets 69 and 70 are chosen so as to compensate for the differences in angular speeds of the tractor wheel 18 and implement wheel 11 necessary to permit them to traverse the same ground distances notwithstanding their differences in diameter. The speed step-up ratio afforded by the difference in diameters of the drive and driven sprockets 69 and 70 is preferably chosen to be substantially the same as the ratios between the rear tractor wheel and the implement wheel diameters. Thus, with the speed changer 57 connected to be driven by the live stub axle 22, and to drive the implement wheel through its driven sprocket 70 connected to the extensible drive shaft 53, tractive power for the tractor-implement combination is supplied through the left tractor wheel 15 and the outboard implement wheel 11, steering difficulties due to side drag or draft being substantially eliminated, especially since the right tractor wheel 16 is freely journaled on the stub axle 22.

With the arrangement as so far described the drive would work well enough in the level position for the implement frame shown in Fig. 2. But with rise or fall of the implement about its pivots, extreme cocking at the shaft joints 61 would take place. That is, with the rocking of the implement frame 12 about its pivotal couplings (at 46, 49) to the tractor along a fore and aft axis substantially inboard of the end of the stub axle 22, the extensible drive shaft 53 would have to swing through a relatively great angle with respect to the frame, causing the universal joints 61 to be cocked to such a degree that extreme accelerations and variations in speed between their two elements would occur, giving a jerky driving effect to the implement wheel 11 and causing undue stresses and wear. Further, such swing of the drive shaft 53 would necessitate a relatively large passageway or clearance for its disposition through the implement frame 12 and beneath the implement body 34. It would also require that the range of extension and contraction of the drive shaft 53 be relatively great and that the cooperating splines of the shaft sections 58 and 59 be machined to a greater axial length than would be desired in the interests of economy.

Pursuant to the present invention, provision is made for imparting a compensating motion to the inner end of the drive shaft 53 so that it is, in effect, retained substantially in uniform position relative to the implement frame as the latter tilts. For such purpose the casing 64 is mounted on a double bearing 78 so that it can swing bodily fore and aft about the axis of the drive sprocket 69. Coacting with this swinging mount of the casing, compensating means in the form of a control link 79 is interconnected between the casing 64 and the implement. By rocking the casing 64 up and down (see Fig. 5) through the intervention of the link 79, the driven sprocket 70 of the speed changer 57 may vary in elevation about the drive sprocket 69 so that the drive shaft 53 is retained in a position in which very little cocking of its joints 61 or variation in its length is required despite extreme tilting of the implement frame 12 (compare Figs. 2, 3, and 4).

In the exemplary installation shown, the link 79 has axially apertured balls swiveled in its opposite ends. The link is thus adapted to be universally connected between studs 80 and 81 provided respectively on the speed changer casing 64 in the region of the driven sprocket 70 and on the implement frame 12 at a point vertically spaced from the normal position of the driven sprocket. As illustrated, the stud 81 on the implement frame may be carried by an upstanding bracket 82 welded to the inboard longitudinal beam 35. The link 79 may be removably connected by the insertion of the studs 80 and 81 through the respective apertured balls, and secured in place by removable linch pins inserted through the ends of the studs.

*Installation and operation*

To install the drive mechanism is but a simple matter. It is only necessary to remove the coupling sleeve 30 from engagement with the stub axle 22 and hub 25, and to place the drive sprocket 69 in splined engagement with the outer end of the stub axle 22 to constitute it the input shaft for the speed changer 57. The sprocket 69 is locked in place by the threaded engagement of the fastening bolt 76. The compensating link 79 is next connected between the respective studs 80 and 81 on the casing 64 and frame 12 and locked in position by the linch pins, and the drive shaft universal couplings 61 are slipped over the cooperating splines of the speed changer output shaft 60 and the implement stub axle 51, being axially secured by the release detents 62 inserted to engage the annular grooves as shown.

When so installed, a positive drive of required speed is afforded for the implement wheel 11. As the tractor 10 is driven power is transmitted from its right axle 18 through the stub axle 22 to the drive sprocket 69, and from the driven sprocket 70 through the drive shaft 53 to the outboard wheel 11. Since the step-up ratio of the speed changer 57 may be selected to compensate for differences in diameters for the tractor and implement wheels, these wheels are driven to traverse the same distances with little or no compensating action by the tractor differential. In addition, braking of the tractor is effective to brake the implement wheel 11 since the brake drum 24 is rigidly connected with the tractor's stub axle 22, i. e., the input shaft for the speed changer 57.

As the implement rocks transversely with respect to the tractor on uneven ground (Figs. 3 and 4), the control link 79 moves vertically up or down with respect to the stub axle 22, thereby swinging the speed changer casing 64 about the axis of the drive sprocket 69 and raising or lowering the vertical position of the driven sprocket 70 to substantially eliminate or considerably reduce vertical swing of the drive shaft 53 with respect to the implement frame 12. See the dash lines and the double-dot lines in Fig. 5, showing the positions of the speed changer resulting from implement tilting as illustrated in Figs. 3 and 4, respectively. Allowance is made for the transverse displacement of the two studs 80 and 81 upon such rocking of the implement by virtue of the universal action of the captive balls in the ends of the compensating link 79. With the vertical swing of the drive shaft 53 thus greatly reduced, cocking of the universal joints 61 with attendant acceleration, strain, and unevenness of power application to the implement wheel 11 are considerably reduced; smooth power application is thus provided through the use of simple, inexpensive and relatively light parts. The telescoping range of the drive shaft 53 also need not be great and the length of the splines between its two sections 58 and 59 may be considerably reduced at a saving in cost. Still further, the passageway provided through the implement frame members 35 and 36 and the clearances between the shaft 53 and the ground or implement body 34 may be considerably less than in a drive not so compensated, enhancing the ability of the implement to traverse rough terrain and the simplification of the body organization and mounting on the frame.

The detachment of the drive mechanism from the tractor and implement is also a simple field operation. It may proceed in substantially the reverse order of the installation steps, that is, the universal joints 61 of the drive shaft 53 are removed from the splines of the implement stub shaft 51 and the speed changer output shaft 60, the compensating link 79 detached from the studs 80 and 81, and the drive sprocket 69 pulled off the splines 31 of the stub axle 22 after removal of the securing bolt 76. The coupling sleeve 30 may then be replaced in engagement with the stub axle 22 and hub 25 to constitute the right tractor wheel 16 again as a power wheel. The tractor may then be driven away, after detachment of the mounting couplings, for employment in other of its many uses. The same drive mechanism may be used between a tractor and a number of different side-mounted implements, thus eliminating the necessity for a separate speed changer and drive shaft for each implement and considerably reducing the total investment required for diversified farming operations.

I claim as my invention:

1. For use with a tractor and side-mounted implement combination wherein the implement has an outboard wheel and is adapted to rock sidewise relative to the tractor, a drive mechanism comprising, in combination, an extensible drive shaft including a plurality of universal joints, said drive shaft being adapted for connection to the implement wheel and extending inboard thereof toward the tractor, a speed changer having a housing and input and output shafts connectable respectively to the tractor's adjacent rear axle and to said drive shaft, bearing means journaling said housing for bodily swinging movement of said speed changer about the center of its input shaft and with its output shaft traversing an arc about such center, and compensating means connected between the implement and said housing for pivoting the latter about said input shaft in response to up and down rocking of the implement relative to the tractor.

2. For use in a tractor and side-mounted implement combination wherein the implement has an outboard wheel of diameter less than that of the tractor's rear wheels and is adapted to rock sidewise relative to the tractor, a drive mechanism comprising, in combination, a drive shaft including two sections cooperatively splined for relative axial movement and universal joints at either end, said drive shaft being adapted for connection to the implement wheel and extending inboard thereof toward the tracator, a speed changer having input and output shafts connectable respectively to the tractor's adjacent rear axle and to said drive shaft, driving and driven sprockets carried respectively by said input and output shafts, the latter being of smaller diameter than the former, an endless chain drivingly connecting said sprockets, and a casing journaling said output shaft and journaled on said input shaft for bodily swinging movement therearound during which said output shaft traverses an arc about said input shaft, and a compensating link universally connected between the implement and said casing for rocking said casing bodily about said input shaft in response to up and down rocking of the implement relative to the tractor.

3. For use with a tractor and side-mounted implement combination wherein the implement has an outboard wheel and is adapted to rock sidewise relative to the tractor, a drive mechanism comprising, in combination, an extensible drive shaft including universal joints at either end, of which is adapted for connection to the implement wheel and the other of which extends inboard thereof toward the tractor, a power-transmitting device having input and output shafts connectable respectively to the tractor's adjacent rear axle and to said other universal joint, means journalling said power-transmitting device on its input shaft for bodily swinging movement thereabout with its output shaft traversing an arc about said input shaft, and a compensating link connected between the implement and said power-transmitting device for rocking the latter bodily about said input shaft in response to up and down rocking of the implement relative to the tractor.

4. For use with a tractor and side-mounted implement combination wherein the implement has an outboard wheel and is adapted to rock sidewise relative to the tractor, a drive mechanism comprising, in combination, a drive shaft adapted for connection to the implement wheel and extending inboard thereof toward the tractor, a power-transmitting device having input and output shafts connectable respectively to the tractor's adjacent near axle and to said drive shaft, means supporting said power-transmitting device for bodily swinging movement about the center of its input shaft and with its output shaft traversing an arc about such center, and compensating means for rocking said power-transmitting device bodily about said center in response to up and down rocking of the implement relative to the tractor.

5. For use with a farm type tractor, an implement having a ground wheel and adapted to be side mounted on the tractor for rocking about a fore and aft axis, a speed changer having spaced input and output shafts and a housing rotatable with respect thereto, means connecting said input shaft to the tractor's axle adjacent said implement, means connecting said output shaft in driving relation to said ground wheel, and compensating means connected between said implement and said housing to swing the latter about said input shaft and raise or lower said output shafts as the implement rocks upwardly or downwardly with respect to the tractor.

6. For use with a tractor having a rear live axle, the combination of an implement adapted to be side-mounted in a manner to permit relative tilting between it and the tractor about a fore and aft axis, said implement including a frame, an outboard ground wheel rotatably mounted on said frame, said frame having a transverse passageway communicating between said wheel and a point adjacent said tractor longitudinally spaced from said axle, a drive shaft extending through said passageway, a universal joint coupling the outboard end of said drive shaft to said wheel, and a power-transmitting device between said live axle and the other end of said shaft adapted to pivot about said axle to raise or lower the point of connection to said drive shaft as the implement tilts relative to the tractor.

7. For use with a tractor, the combination comprising an implement including a frame, a ground wheel rotatably carried by said frame, and means for attaching said frame along the side of the tractor for pivoting about a substantially fore and aft axis with said ground wheel spaced laterally from and generally parallel to one of the tractor's rear wheels; a stub axle adapted to be bolted to the tractor's rear axle in lieu of its rear wheel; means freely journaling the rear wheel on said stub axle; a drive mechanism including a housing, spaced sprockets journaled in said housing, and a chain drivingly connecting said sprockets; means for removably mounting one of said sprockets on said stub axle to be driven thereby; a telescopic drive shaft; universal joints connecting said drive shaft between the other of said sprockets and said ground wheel; and a control link universally connected between said housing and said frame for pivoting said housing about said stub axle and raising or lowering said other sprocket as an incident to relative tilting of the tractor and implement about said fore and aft axis.

References Cited in the file of this patent
UNITED STATES PATENTS

| | | |
|---|---|---|
| 1,232,781 | Ferguson | July 10, 1917 |
| 1,941,821 | Baker | Jan. 2, 1934 |
| 2,575,466 | Paul | Nov. 20, 1951 |
| 2,630,870 | Paul | Mar. 10, 1953 |
| 2,668,597 | King | Feb. 9, 1954 |